(12) United States Patent
Hirata

(10) Patent No.: US 10,994,613 B2
(45) Date of Patent: May 4, 2021

(54) INFORMATION DISPLAY DEVICE

(71) Applicant: Maxell, Ltd., Kyoto (JP)

(72) Inventor: Koji Hirata, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/636,655

(22) PCT Filed: Jun. 19, 2018

(86) PCT No.: PCT/JP2018/023176
§ 371 (c)(1),
(2) Date: Feb. 5, 2020

(87) PCT Pub. No.: WO2019/053987
PCT Pub. Date: Mar. 21, 2019

(65) Prior Publication Data
US 2020/0353816 A1    Nov. 12, 2020

(30) Foreign Application Priority Data

Sep. 15, 2017  (JP) .............................. JP2017-177342

(51) Int. Cl.
*B60K 35/00* (2006.01)
*G06F 3/01* (2006.01)
*H04N 9/31* (2006.01)

(52) U.S. Cl.
CPC .............. *B60K 35/00* (2013.01); *G06F 3/013* (2013.01); *H04N 9/3129* (2013.01);
(Continued)

(58) Field of Classification Search
CPC ............ B60K 35/00; B60K 2370/1529; B60K 2370/23; B60K 2370/167; G06F 3/013; H04N 9/3129
See application file for complete search history.

(56) References Cited

U.S. PATENT DOCUMENTS 7,199,767 B2 *  4/2007  Spero ....................... G02B 5/20
                                                                345/7
2009/0005961 A1 *  1/2009  Grabowski ............ G02B 27/01
                                                                701/532
(Continued)

FOREIGN PATENT DOCUMENTS

JP    2007-062515 A     3/2007
JP    2007-272350 A    10/2007
(Continued)

OTHER PUBLICATIONS

International Search Report of PCT/JP2018/023176 dated Sep. 18, 2018.
(Continued)

*Primary Examiner* — Muhammad E Edun
(74) *Attorney, Agent, or Firm* — Mattingly & Malur, PC

(57) ABSTRACT

An object of the invention is to provide an information display device that displays information in a vehicle, can reduce the movement of the viewpoint of a viewer, and can obtain a large amount of image information. In order to achieve the object, there is provided an information display device that displays information in a vehicle and includes a first information display device that displays image information of a virtual image using reflection from a windshield of the vehicle, a second information display device that scans the windshield with laser light using a MEMS element to obtain a real image, and a third information display device using an instrument panel of the vehicle.

10 Claims, 13 Drawing Sheets

(52) U.S. Cl.
CPC ............... *B60K 2370/1529* (2019.05); *B60K 2370/167* (2019.05); *B60K 2370/23* (2019.05)

(56) References Cited

U.S. PATENT DOCUMENTS

| | | |
|---|---|---|
| 2009/0278677 A1 | 11/2009 | Arie et al. |
| 2014/0008412 A1* | 1/2014 | Zemlok ............... A61B 90/90 227/177.1 |
| 2015/0070157 A1 | 3/2015 | Murayama et al. |
| 2016/0195719 A1 | 7/2016 | Yonetani |
| 2018/0172990 A1 | 6/2018 | Fujita |
| 2019/0080496 A1* | 3/2019 | Wakatsuki ............... G06T 11/00 |
| 2019/0086661 A1 | 3/2019 | Misawa et al. |
| 2019/0265468 A1 | 8/2019 | Hirata et al. |

FOREIGN PATENT DOCUMENTS

| | | |
|---|---|---|
| JP | 2012-037340 A | 2/2012 |
| JP | 2013-078964 A | 5/2013 |
| JP | 2015-054597 A | 3/2015 |
| JP | 2015-194707 A | 11/2015 |
| JP | 2016-101805 A | 6/2016 |
| JP | 2017-083739 A | 5/2017 |
| JP | 2017-146343 A | 8/2017 |
| WO | 2017/043108 A1 | 3/2017 |
| WO | 2017/061019 A1 | 4/2017 |
| WO | 2017/064797 A1 | 4/2017 |

OTHER PUBLICATIONS

Japanese Office Action received in corresponding Japanese Application No. 2017-177342 dated Feb. 2, 2021.

\* cited by examiner

F I G. 1 3
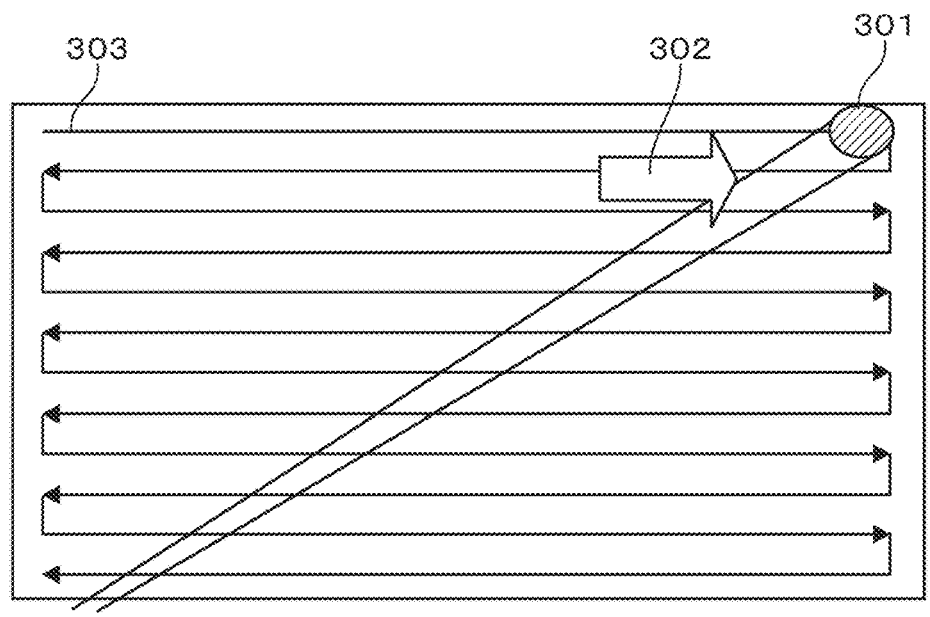
F I G. 1 4
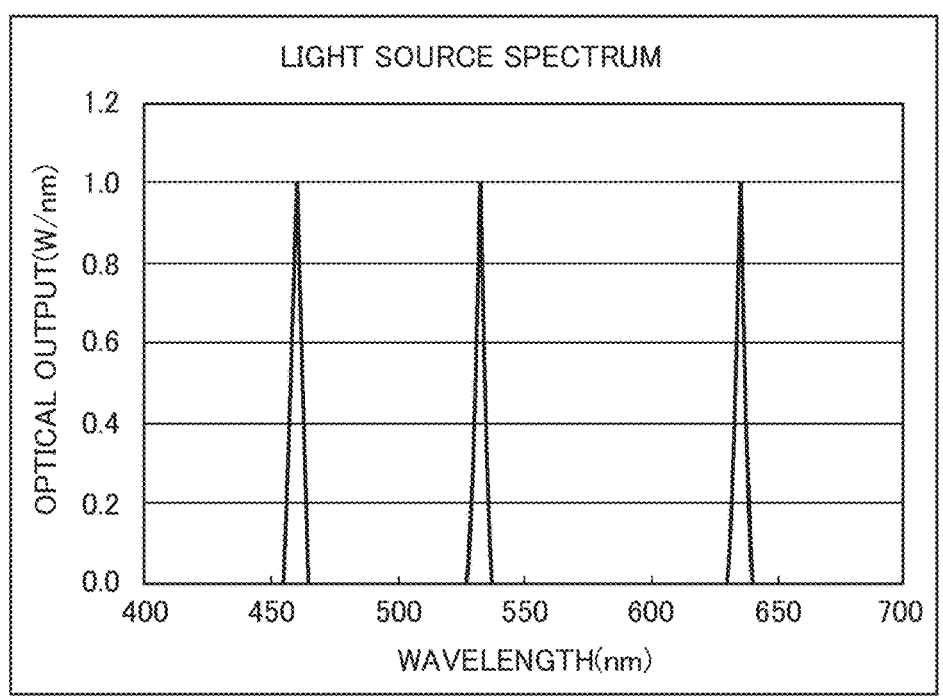

F I G. 1 5
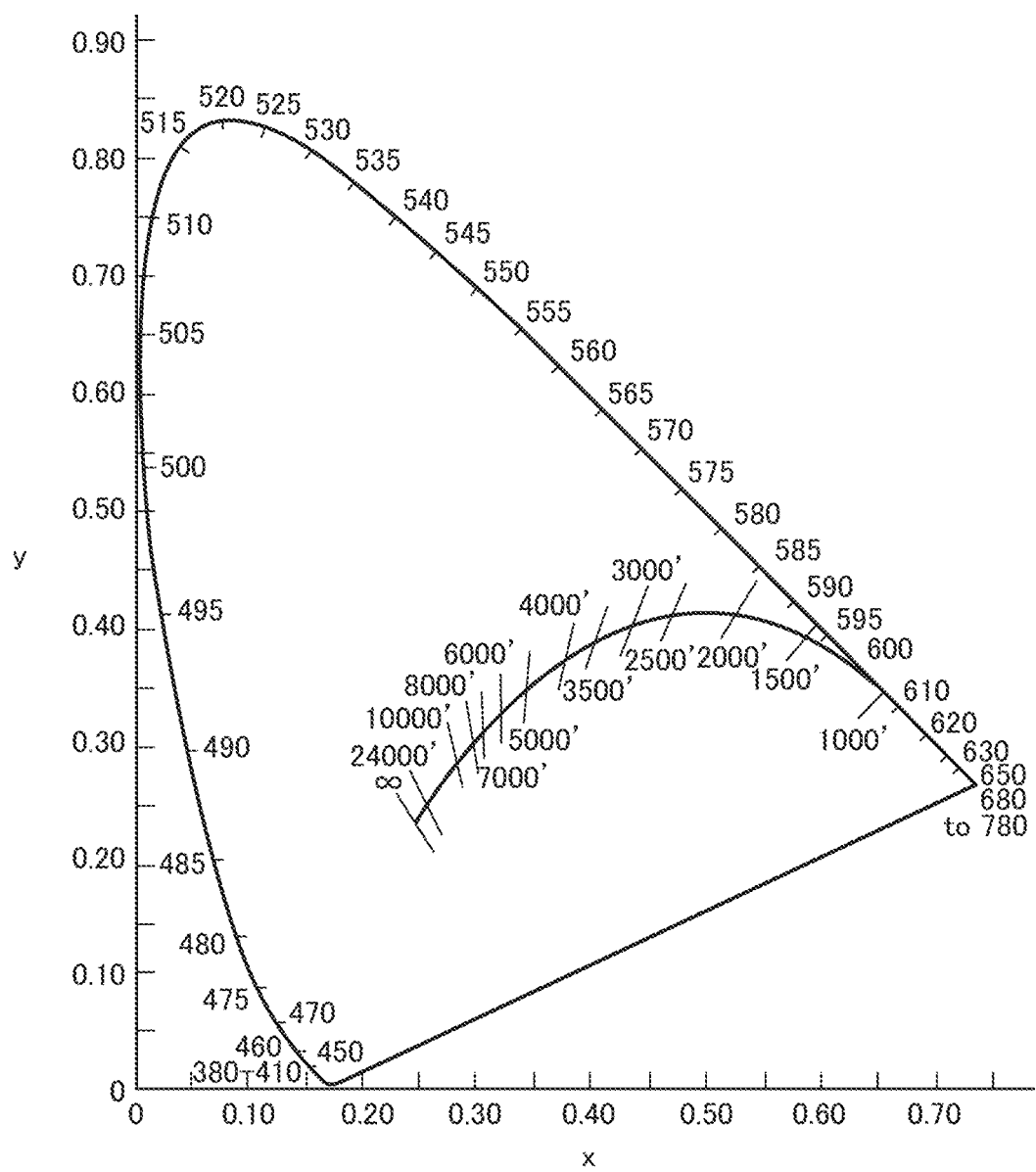

F I G. 16

| | COLOR MIXING RATIO | | | BRIGHTNESS RATIO | CHROMATICITY | |
|---|---|---|---|---|---|---|
| | B(460) | G(532) | R(635) | | x | y |
| LASER SINGLE COLOR | 1 | 0 | 0 | 172 | 0.144 | 0.03 |
| | 0 | 1 | 0 | 2536 | 0.17 | 0.796 |
| | 0 | 0 | 1 | 623 | 0.714 | 0.286 |
| NTSC SINGLE COLOR | 1 | 0 | 0 | — | 0.14 | 0.08 |
| | 0 | 1 | 0 | — | 0.21 | 0.71 |
| | 0 | 0 | 1 | — | 0.67 | 0.33 |
| COLOR CORRESPONDING TO NTSC | 1 | 0.05 | 0 | 299 | 0.145 | 0.05 |
| | 0.05 | 1 | 0.1 | 2607 | 0.2 | 0.766 |
| | 0 | 0.05 | 1 | 750 | 0.677 | 0.321 |
| BRIGHTNESS- EMPHASIZED COLOR | 1 | 0.1 | 0.05 | 457 | 0.155 | 0.074 |
| | 0.025 | 1 | 0.2 | 2665 | 0.232 | 0.708 |
| | 0 | 0.1 | 1 | 877 | 0.644 | 0.351 |

FIG. 19

| | COLOR MIXING RATIO | | | | | | BRIGHTNESS RATIO | CHROMATICITY | |
|---|---|---|---|---|---|---|---|---|---|
| | B1(460) | B2(450) | G1(532) | G2(515) | R1(635) | R2(645) | | x | y |
| LASER SINGLE COLOR | 1 | 0 | 0 | 0 | 0 | 0 | 282 | 0.15 | 0.024 |
| | 0 | 0 | 1 | 0 | 0 | 0 | 4280 | 0.118 | 0.802 |
| | 0 | 0 | 0 | 0 | 0 | 1 | 1126 | 0.716 | 0.284 |
| NTSC SINGLE COLOR | | | | | | | — | 0.14 | 0.08 |
| | | | | | | | — | 0.21 | 0.71 |
| | | | | | | | — | 0.67 | 0.33 |
| COLOR CORRESPONDING TO NTSC | 1 | 1 | 0.05 | 0.1 | 0 | 0 | 578 | 0.149 | 0.049 |
| | 0 | 0 | 1 | 1 | 0.1 | 0.5 | 4541 | 0.208 | 0.723 |
| | 0 | 0 | 0.05 | 0.1 | 1 | 1 | 1322 | 0.658 | 0.331 |
| BRIGHTNESS-EMPHASIZED COLOR | 1 | 1 | 0.05 | 0.1 | 0.05 | 0 | 704 | 0.153 | 0.056 |
| | 0 | 0 | 1 | 1 | 0.5 | 0.1 | 4632 | 0.23 | 0.704 |
| | 0 | 0 | 0.15 | 0.05 | 1 | 1 | 1489 | 0.637 | 0.354 |

INFORMATION DISPLAY DEVICE

TECHNICAL FIELD

The present invention relates to an information display device that projects an image on a windshield of a so-called vehicle, such as a car, a train, or an airplane, which transports persons.

BACKGROUND ART

A so-called head-up-display (HUD) device that projects image light on a windshield of a car to form a virtual image and displays traffic information, such as route information or congestion information, and car information, such as the remaining fuel level and cooling water temperature, has already been known in, for example, the following Patent Document 1.

In this type of information display device, there is a demand for reducing the size of the device in order to provide an HUD device main body between the window glass and the steering wheel in front of the driver's seat.

CITATION LIST

Patent Document

Patent Document 1: JP 2015-194707 A

SUMMARY OF THE INVENTION

Problems to be Solved by the Invention

The principle of generating a virtual image using a concave mirror for achieving a head-up-display device according to the related art is as follows: an object point AB is disposed inside a focus F (focal length f) with respect to a point O on the optical axis of a concave mirror 1' to obtain a virtual image using the concave mirror 1' as illustrated in FIG. 20. In FIG. 20, for convenience of description, the concave mirror 1' is regarded as a convex lens having the same positive refractive power and the relationship between the object point, the convex lens (for convenience of description, a concave mirror in FIG. 20), and a generated virtual image is illustrated.

In the related art, the object point AB may be close to the focus F in order to enlarge the size of the virtual image generated by the concave mirror 1'. However, the curvature radius of the concave mirror is reduced in order to obtain a desired magnification ratio. As a result, the size of the mirror is reduced and only a virtual image which has a high effective magnification ratio and has a narrow viewable range is obtained. Therefore, it is necessary to match the dimensions of the concave mirror with a viewing range and to determine the magnification ratio of the virtual image in consideration of a balance with the image display device, in order to simultaneously satisfy (1) the desired size of the virtual image and (2) the required magnification ratio of the virtual image M=b/a.

Meanwhile, in the virtual-image-type HUD disclosed in Patent Document 1, the dimensions of the concave mirror for creating a virtual image increase in order to increase the dimensions of the virtual image that can be seen by the viewer. As a result, the volume of the device increases.

In addition, Patent Document 1 discloses an HUD that displays a virtual image of information such as so-called speed information. However, so-called augmented reality which expands the viewable range of the virtual image that can be seen by the viewer, increases the size of the virtual image, and superimposes the virtual image on a real image of a distant view seen by the viewer is not considered in Patent Document 1. In order to achieve the augmented reality, it is necessary to increase the distance from an image source to the concave mirror. In addition, when a case in which a virtual image is superimposed on a real image of a near view is considered, it is necessary to consider an image display device that can reduce the movement of a viewpoint and can obtain a large amount of image information.

Accordingly, the invention has been made in view of the above-mentioned problems and an object of the invention is to provide an image display device that can reduce the movement of the viewpoint of a viewer and obtain a large amount of image information.

Solutions to Problems

According to an embodiment of the invention, in consideration of the above-mentioned background art and problems, there is provided an information display device that displays information in a vehicle and includes: a first information display device that displays image information of a virtual image using reflection from a windshield of the vehicle; a second information display device that scans the windshield with laser light using a MEMS element to obtain a real image; and a third information display device using an instrument panel of the vehicle. The first information display device includes a virtual image optical system that reflects light emitted from an image display device which displays the image information to the windshield to display a virtual image in front of the vehicle. The second information display device includes a real image optical system that performs scanning with laser light using a scanning-type mirror element and displays a real image on the windshield. The third information display device includes a direct-view-type image display device as the instrument panel. An image display position of the first information display device is in the vicinity of a center of the windshield and an image display position of the second information display device is a lower part of the windshield.

Effects of the Invention

According to the invention, it is possible to provide an information display device that combines the display of an HUD device that superimposes a virtual image on a distant view, the display of a real image display device that displays a real image superimposed on a near view, and the display of an instrument panel to reduce the movement of the viewpoint of a driver and to contribute to assisting safe driving.

BRIEF DESCRIPTION OF THE DRAWINGS

FIG. 13 is a diagram describing a first scanning state of laser light with which a projection target member (an inner surface of a windshield) is scanned in Embodiment 3.

FIG. 14 is a diagram illustrating a light source light spectrum of an optical scanning device in the first scanning state in Embodiment 3.

FIG. 15 is a diagram illustrating a black body locus and an isotemperature line.

FIG. 16 illustrates a chromaticity table of light source light of the optical scanning device in the first scanning state in Embodiment 3.

FIG. 19 illustrates a chromaticity table of light source light of the optical scanning device in the second scanning state in Embodiment 3.

MODE FOR CARRYING OUT THE INVENTION

Hereinafter, embodiments of the invention will be described in detail with reference to, for example, the drawings.

Embodiment 1

Figure 1A:
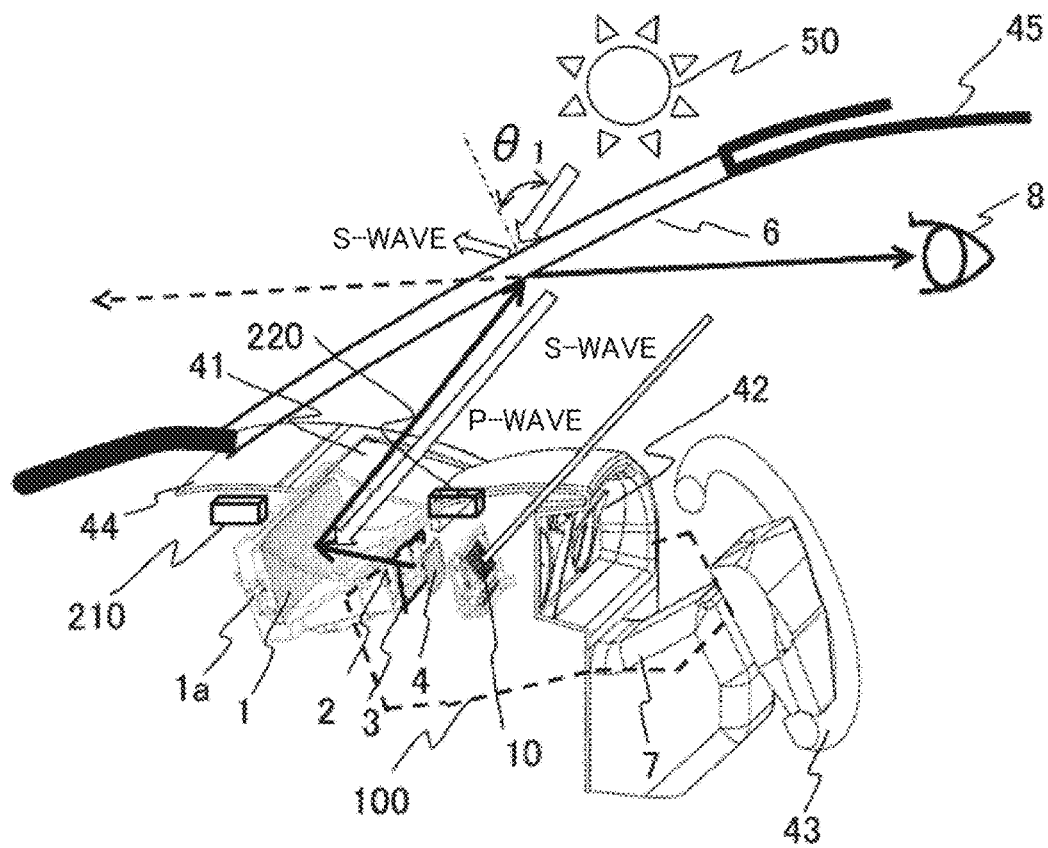
FIG. 1A is a cross-sectional perspective view illustrating an information display device in Embodiment 1.

First, the schematic configuration of an information display device and peripheral devices of the information display device will be described. Here, for example, particularly, an information display device that projects an image on a windshield of a car will be described. FIG. 1A is a cross-sectional perspective view illustrating the information display device and FIG. 1B is block diagram illustrating the schematic configuration of the peripheral devices.

Figure 1B:
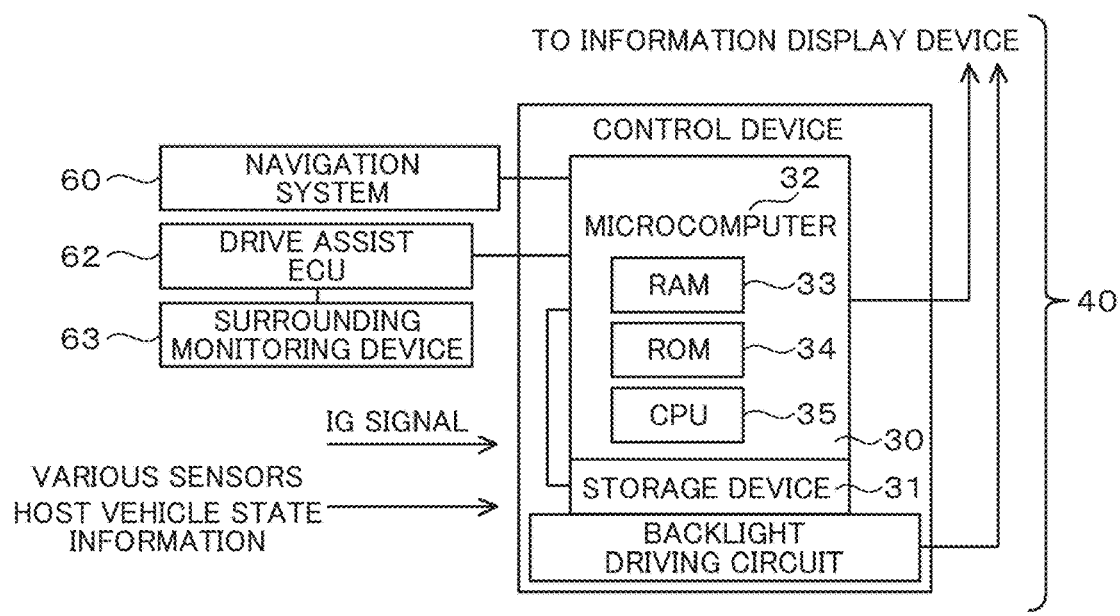
FIG. 1B is a block diagram schematically illustrating the configuration of peripheral devices of the information display device in Embodiment 1.

In FIG. 1B, a control device 40 acquires, from a navigation system 60, various kinds of information, such as the speed limit and the number of lanes of a road corresponding to a current position where a host vehicle is traveling and a planned travel route of the host vehicle set in the navigation system 60, as foreground information (that is, information displayed in front of a vehicle by the virtual image).

A drive assist ECU 62 is a control device that controls a driving system or a control system according to obstacles detected as the result of monitoring by a surrounding monitoring device 63 to achieve drive assist control and examples of the drive assist control include well-known techniques, such as cruise control, adaptive cruise control, pre-crash safety, and lane keeping assist.

The surrounding monitoring device 63 is a device that monitors the surroundings of the host vehicle and is, for example, a camera that detects objects around the host vehicle on the basis of a captured image of the surroundings of the host vehicle or a search device that detects objects around the host vehicle on the basis of the result of transmitting and receiving search waves.

The control device 40 acquires the information (for example, the distance to the vehicle in front, the azimuth of the vehicle in front, and a position where an obstacle or a sign is present) from the drive assist ECU 62 as the foreground information. In addition, an ignition (IG) signal and host vehicle state information are input to the control device 40. Of the information items, the host vehicle state information is acquired as vehicle information and includes, for example, warning information indicating a predetermined abnormal state, such as the remaining amount of fuel or the temperature of cooling water in an internal combustion engine. In addition, the vehicle state information includes, for example, the operation result of a direction indicator, the traveling speed of the host vehicle, and shift position information.

An image signal from the control device 40 is image information corresponding to the state of the car and the surrounding environment and is appropriately and selectively displayed on an HUD device 100 which is a first information display device that superimposes a virtual image on a distant real view seen by a viewer, a projection optical device 220 which is a second information display device which superimposes a real image on a near view, and a direct-view-type instrument panel 42 which is a third information display device. Therefore, the movement of the viewpoint of the driver who is a viewer during driving is reduced. The control device 40 is started in when an ignition signal is input. The above is the configuration of the entire system of the information display device according to this embodiment.

FIG. 1A is an image diagram illustrating a longitudinal section of a car body. In FIG. 1A, reference numeral 45 denotes a car body and reference numeral 6 denotes a windshield that is a projection target member. The HUD device 100 is a device that displays various kinds of information reflected by the projection target member 6 (in this embodiment, the inner surface of the windshield) as a virtual image in order to form a virtual image in front of the host vehicle along the viewpoint 8 of the driver. In addition, the projection target member 6 may be any member on which information is projected and may be not only the above-mentioned windshield but also a combiner. That is, the HUD device 100 according to this embodiment may be any device that forms a virtual image in front of the host vehicle along the viewpoint 8 of the driver such that the driver visually recognizes the virtual image. The information displayed as the virtual image includes, for example, vehicle information and foreground information captured by a camera (not illustrated) such as a surveillance camera or an around viewer.

In addition, in the HUD device 100, an image display device 4 that projects image light for displaying information and lenses 2 and 3 which are correction optical elements for correcting distortion and aberration that occur when a virtual image is formed by a concave mirror 1 using the image displayed on the image display device 4 are provided between the image display device 4 and the concave mirror 1.

The HUD device 100 includes the control device 40 that controls the image display device 4 and a backlight source 10. In addition, an optical component including the image display device 4 and the backlight source 10 is a virtual image optical system which will be described below and includes the concave mirror 1 having a concave surface shape that reflects light. Light reflected by the concave mirror 1 is reflected from the windshield 6 and travels to the viewpoint 8 of the driver (which may be a viewpoint range of the driver that can be viewed correctly, for example, a so-called Eyebox).

Examples of the image display device 4 include a liquid crystal display (LCD) having a backlight and a self-emitting vacuum fluorescent display (VFD).

In contrast, instead of the image display device 4, a projection device may display an image on a screen, the image may be reflected to the windshield 6 which is the projection target member by the concave mirror 1, and a virtual image may be reflected from the windshield 6 to the viewpoint 8 of the driver. For example, the screen may be a microlens array in which microlenses are two-dimensionally arranged.

More specifically, the concave mirror 1 may have the following shape in order to reduce the distortion of the virtual image: the curvature radius of an upper part (a region from which a light beam is reflected to a lower part of the windshield 6 whose distance to the viewpoint of the driver is relatively short) illustrated in FIG. 1A is relatively small such that an enlargement ratio is high; on the other hand, the curvature radius of a lower part (a region from which a light beam is reflected to an upper part of the windshield 6 whose distance to the viewpoint of the driver is relatively long) is relatively large such that the enlargement ratio is low. In addition, the image display device 4 may be inclined with respect to the optical axis of the concave mirror to correct the difference in the magnification of the virtual image, thereby reducing the distortion to be generated. In this case, it is possible to achieve better correction.

Figure 2:
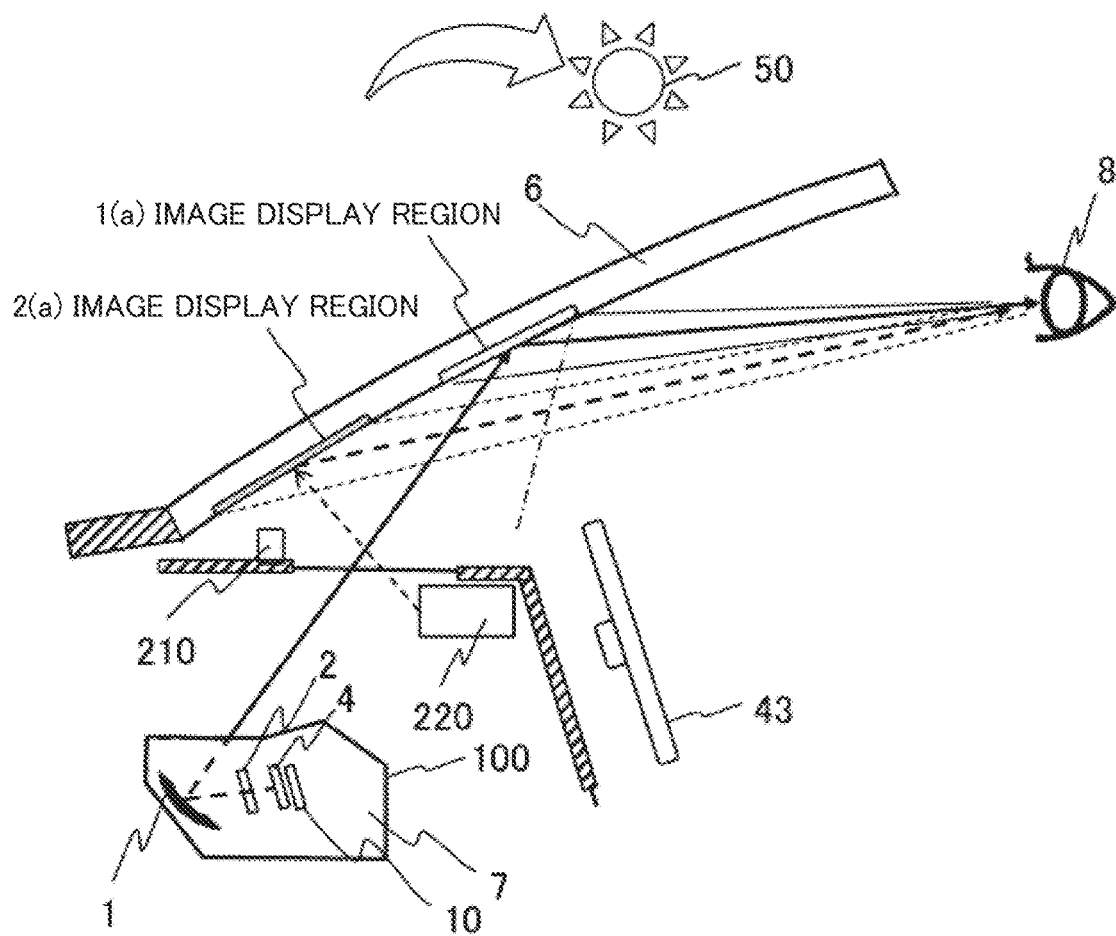
FIG. 2 is a cross-sectional view schematically illustrating the configuration of the information display device, a windshield, and a viewpoint position of a driver in Embodiment 1.

FIG. 2 is a cross-sectional view schematically illustrating the configuration of the information display device, the windshield, and the viewpoint position of the driver in this embodiment.

Figure 3:
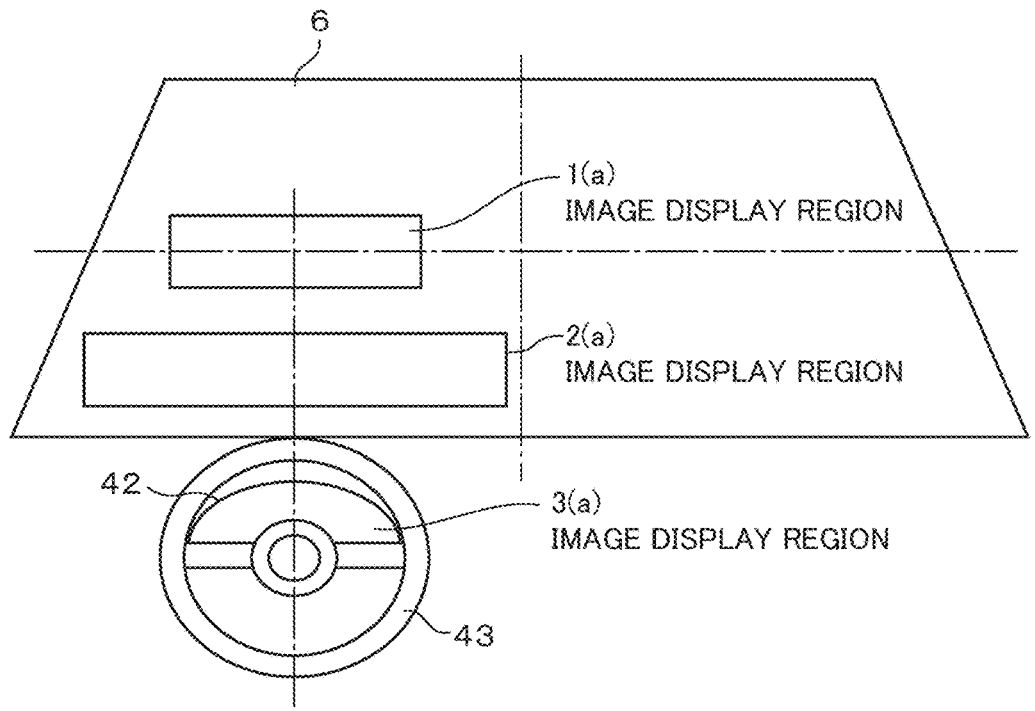
FIG. 3 is a diagram schematically describing an image display position in Embodiment 1.

FIG. 3 is a diagram schematically illustrating an image display position in this embodiment. FIG. 3 is a schematic diagram illustrating the windshield 6 viewed from the driver's seat.

As illustrated in FIGS. 2 and 3, in this embodiment, an image display region 1(a) in the vicinity of the center of the windshield 6 in the front of a steering wheel 43, an image display region 2(a) in the lower part of the windshield 6, and an image display region 3(a) on the instrument panel 42 are provided.

In the information display device according to this embodiment, the HUD device 100 provides a viewer with a virtual image with a size of 40 inches or more at a virtual image distance of 8 m, using the image display region 1(a) illustrated in FIGS. 2 and 3 which is located in the vicinity of the center of the windshield 6 as a reflective surface, such that the virtual image is superimposed on the real view seen by the viewer during driving, which makes it possible to suppress the movement of the viewpoint.

The inventors measured a change in the viewpoint position of the driver during city driving, found by actual measurement that, when the maximum value of the virtual image distance was 30 m, the movement of the viewpoint was suppressed by 90%, and found by experiment that, when the virtual image distance was 70 m or more during high-speed driving, the movement of the viewpoint could be similarly suppressed. The size of the virtual image required at this time is equivalent to 350 inches.

As described above, a virtual image is displayed in the image display region 1(a) illustrated in FIGS. 2 and 3 by the HUD device 100 that displays a virtual image in the region in which the viewpoint of the viewer is far away. In contrast, a real image is displayed in the image display region 2(a) illustrated in FIGS. 2 and 3 by the projection optical device 220 that scans the lower part of the windshield with a specific polarized light beam using a micro electro mechanical systems (MEMS) element in order to superimpose an image on the near view seen by the driver who is a viewer. Here, the display of the image by the MEMS is advantageous for projection on the windshield 6 having a curvature since it is basically focus-free.

The lower part of the windshield on which an image is displayed contains a member having a characteristic that reflectance for a specific polarized wave is different from reflectance for other polarized waves, which will be described in detail below, or the member is applied, adhered, or stuck to a glass surface in the car to efficiently reflect image light such that the viewer sees a real image. Here, the horizontal display dimension of the image display region 1(a) on the windshield 6 by the HUD device 100 is less than the horizontal display dimension of a real image region by the projection optical device 220 in order to focus a virtual image on a distant point in front of the windshield.

Figure 4:
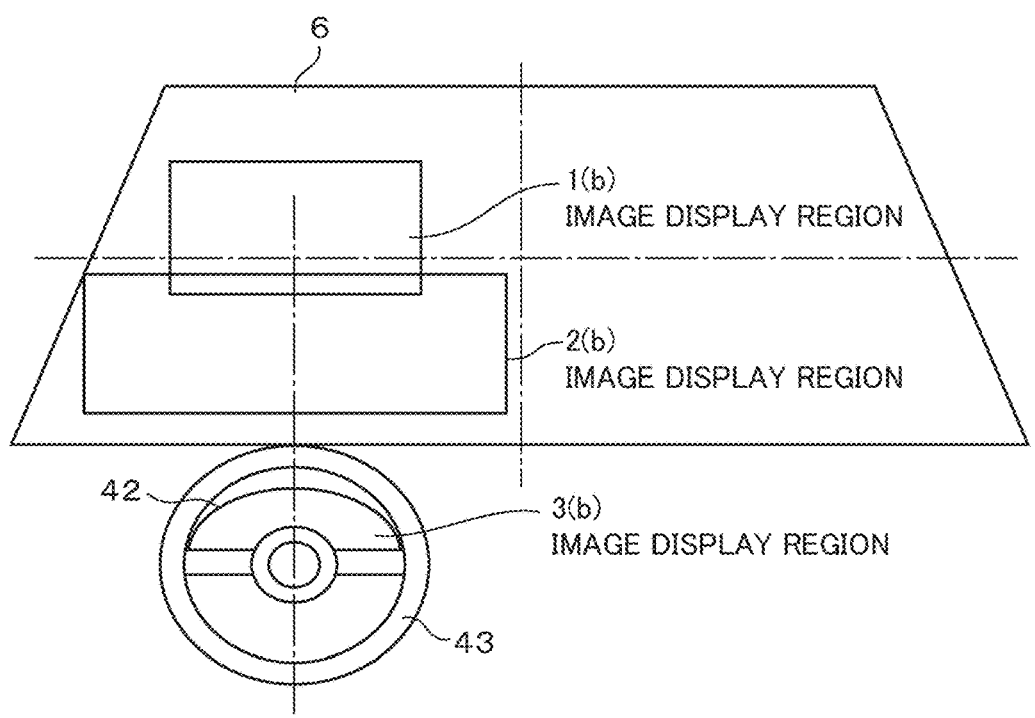
FIG. 4 is a diagram schematically describing another image display position in Embodiment 1.

Further, the following was proved by experiments: instead of dividing the image display region, as illustrated in FIG. 4, a part or all of a distant image display region 1(b) in which a virtual image was displayed by the HUD device and an image display region 2(b) in which an image was superimposed on a near view were displayed so as to be superimposed on each other to perform stereoscopic display in a pseudo manner. A good effect was obtained by partially overlapping a display position in the depth direction of a virtual image with a display position in the depth direction of a real image in order to achieve better display. In addition, new effects, such as the continuity of the displayed image and the smooth movement of the viewpoint, were obtained by the superimposed display of two image display regions.

The display position, display color, and display interval of the virtual image displayed in the vicinity of the center of the windshield are appropriately selected by a viewing camera 210 for viewing the state of the viewer. Information related to the next operation to be performed by the car controlled in an autonomous driving state, such as an operation of turning right or left, stopping, or acceleration, is displayed as an image. In addition, for example, the health condition or drowsiness of the driver is sensed and an image calling for attention is displayed on the basis of these information items. It is not necessary to always display these information items and it is desirable to track the movement of the eye line of the driver using the viewing camera 210 and to display these information items in a necessary place as needed.

Figure 5:
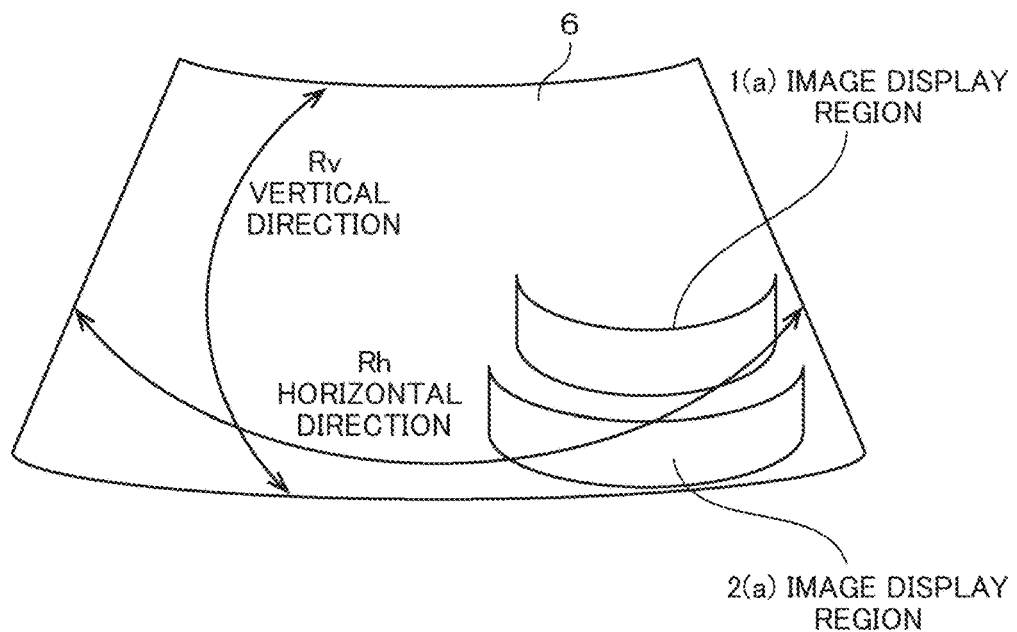
FIG. 5 is a diagram describing a difference in the curvature radius of the windshield in Embodiment 1.

As illustrated in FIG. 5, in the windshield 6 of the car, a curvature radius Rv in the vertical direction and a curvature radius Rh in the horizontal direction are different from each other and Rh>Rv is generally satisfied. For this reason, as illustrated in FIG. 5, when the windshield 6 is considered as a reflective surface, it becomes a toroidal surface of a concave mirror. Therefore, in the HUD device 100 according to this embodiment, the concave mirror 1 may have a shape in which the average curvature radii in the horizontal direction and the vertical direction are different from each other so as to correct the magnification ratio of the virtual image by the shape of the windshield 6, that is, to correct the difference between the curvature radii of the windshield in the horizontal direction and the vertical direction. At this time, the shape of the concave mirror 1 is a function of a distance h from the optical axis in the shape of a spherical or aspherical surface (represented by the following Expression (2)) symmetric with respect to the optical axis and it is difficult to individually control horizontal and vertical cross-sectional shapes at a distant position. Therefore, it is preferable to correct the shape of the concave mirror 1 as a function of the coordinates (x,y) of a surface from the optical axis of the mirror surface as a free-form surface represented by the following Expression (1).

[Equation 1]

$$Z = \frac{c \cdot (x^2 + y^2)}{1 + \sqrt{1 - (1+K)c^2 \cdot (x^2 + y^2)}} + \sum\sum (Cj(m, n) \times x^m \times y^n) \quad (1)$$

[Equation 2]

$$Z = \frac{c \cdot h^2}{1 + \sqrt{1 - (1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20} \quad (2)$$

Here, z is the amount of sag at the coordinates (x,y) based on an axis defining a surface, c is curvature at the origin of the axis defining the surface, K is a conic constant, and Cj is a coefficient.

Returning to FIG. 1A, further, for example, the optical element 2 and the optical element 3 are provided as transmissive optical components between the image display device 4 and the concave mirror 1 and the emission direction of a light beam to the concave mirror is controlled to correct distortion in accordance with the shape of the concave mirror and to correct the aberration of a virtual image including astigmatism caused by the difference between the curvature radii of the windshield 6 in the horizontal direction and the vertical direction at the same time.

Figure 6:
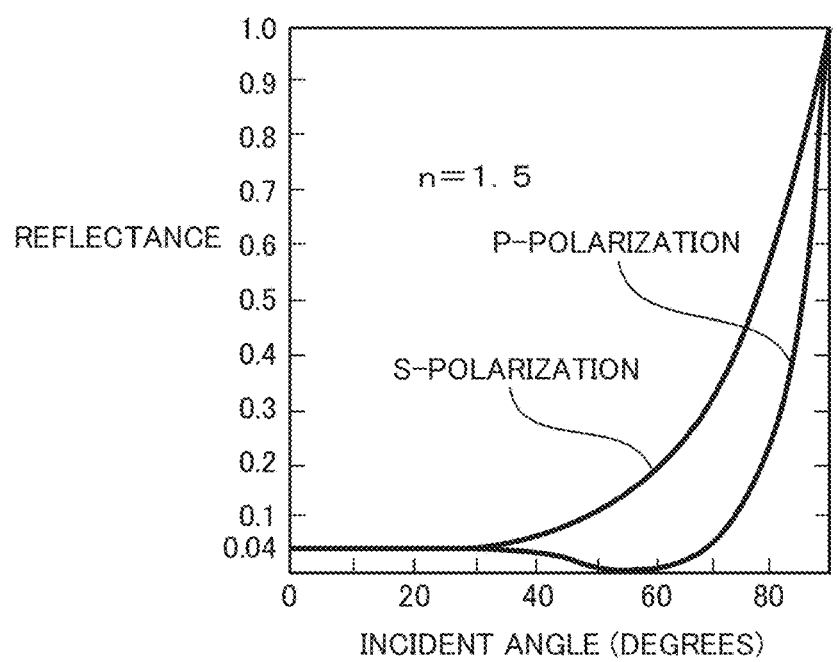
FIG. 6 is a diagram illustrating reflectance characteristics of glass for different types of polarized light with respect to an incident angle in Embodiment 1.

In contrast, as illustrated in FIGS. 1A and 2, for light beams from the sun 50, most of the S-polarized light is reflected by the windshield and most of the P-polarized light is incident into the car. Therefore, the projection optical device 220 that makes an S-polarized light beam incident on the MEMS element to perform scanning is used to project an image onto the lower part of the windshield in order to superimpose the image on a near view. Another reason for using the S-polarized light for image display at this time is that the inclination angle of the windshield is equal to or greater than 40 degrees and the reflectance of the windshield with respect to the S-polarized light is high as illustrated in FIG. 6.

Figure 7:
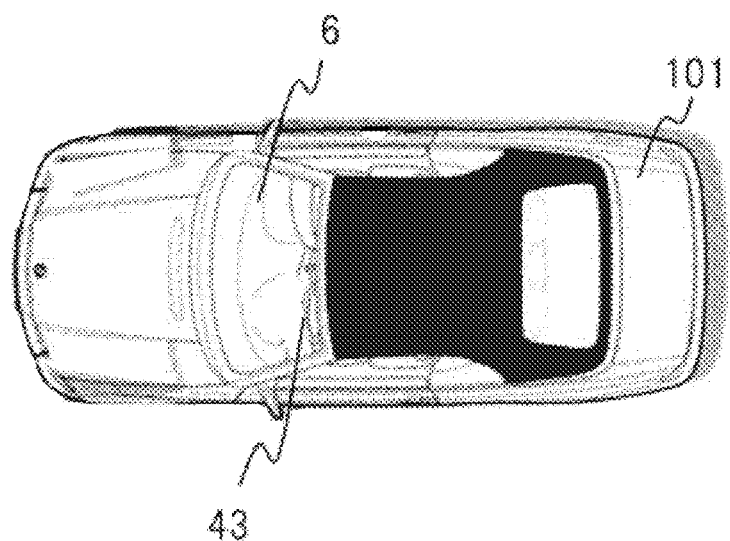
FIG. 7 is a top view illustrating a car provided with the information display device in Embodiment 1.

In addition, the reason is that, in the windshield of the car, the curvature radius Rh in the horizontal direction and the curvature radius Rv in the vertical direction are different from each other as illustrated in FIG. 5 and, for the position of the driver who is a viewer (the position of the steering wheel 43 in FIG. 7), the center of the image is different from the center of the curvature in the horizontal direction as illustrated in FIG. 7.

Figure 8:
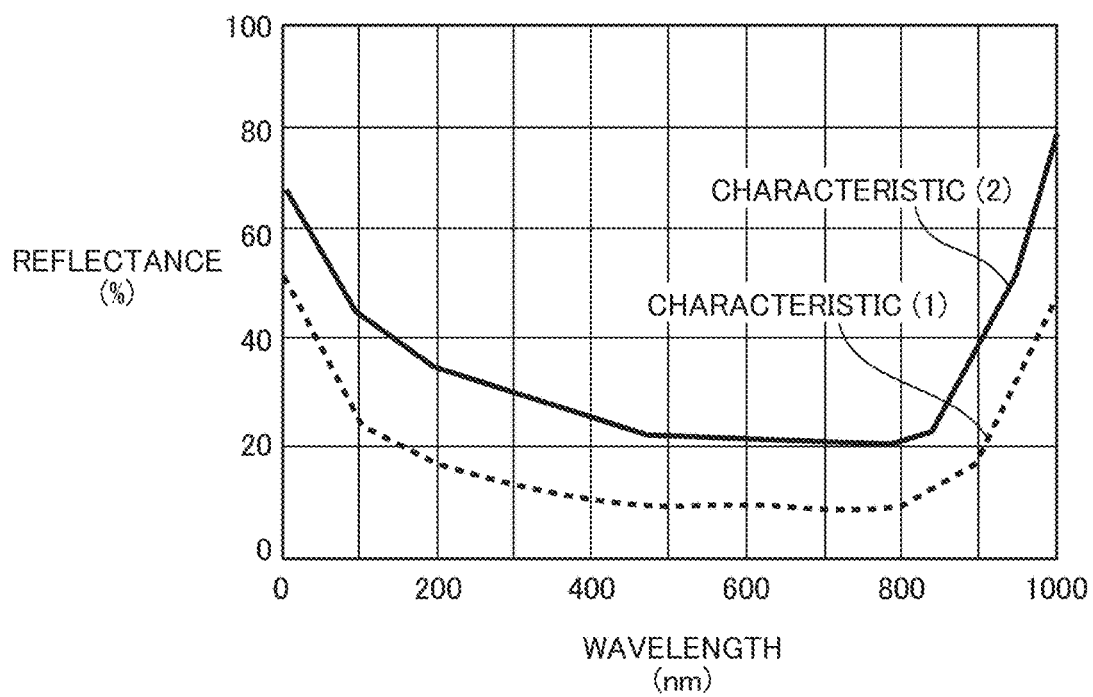
FIG. 8 is a characteristic diagram illustrating the reflection characteristics of a reflective material that is applied, adhered, or stuck to the windshield in Embodiment 1.

In contrast, the projection optical device 220 performs scanning in the vertical and horizontal directions with the MEMS using a laser light source and projects an image on the windshield. The member having a characteristic that reflectance for the S-polarized light is different from reflectance for the P-polarized light is contained in the image display region 2(a) provided in the lower part of the windshield illustrated in FIGS. 2 and 3, or the member is applied, adhered, or stuck to the glass surface in the car to efficiently reflect image light such that the viewer sees a real image. Specifically, as illustrated in FIG. 8, the member having an average reflectance of about 10% as illustrated in characteristic (1) to about 20% as illustrated in characteristic (2) for S-polarized laser light in a visible light range (380 nm to 780 nm) may be used such that image light is reflected to the driver who is a viewer by a reflective surface of the window glass inside the car.

More specifically, sheets obtained by stacking optical multilayer films having the above-described characteristics or a plurality of sheets having different refractive indices may be stacked to obtain the same effect as described above. In addition, a sheet surface may have an uneven shape in order to increase diffusion characteristics in the horizontal direction of the window glass, as compared to diffusion characteristics in the vertical direction.

In addition, the reflectance of the above-mentioned sheet is set to be high in an ultraviolet region (smaller than 380 nm) and a near infrared region (greater than 780 nm) in order to prevent the incidence of ultraviolet rays and near infrared rays into the car and thus to achieve a more comfortable environment.

As described above, this embodiment relates to an information display device that displays information in a vehicle and includes: a first information display device that displays image information of a virtual image using reflection from a windshield of the vehicle; a second information display device that scans the windshield with laser light using a MEMS element to obtain a real image; and a third information display device using an instrument panel of the vehicle. The first information display device includes a virtual image optical system that reflects light emitted from an image display device which displays the image information to the windshield to display a virtual image in front of the vehicle. The second information display device includes a real image optical system that performs scanning with laser light using a scanning-type mirror element and displays a real image on the windshield. The third information display device includes a direct-view-type image display device as the instrument panel. An image display position of the first information display device is in the vicinity of a center of the windshield and an image display position of the second information display device is a lower part of the windshield.

Therefore, it is possible to provide an information display device that combines the display of the HUD device that superimposes a virtual image on a distant view, the display of the real image display device that displays a real image superimposed on a near view, and the display of the instrument panel to reduce the movement of the viewpoint of the driver and to contribute to assisting safe driving.

Embodiment 2

In this embodiment, a more specific optical configuration of an HUD device having the virtual image optical system of the above-mentioned information display device will be described.

Figure 9:
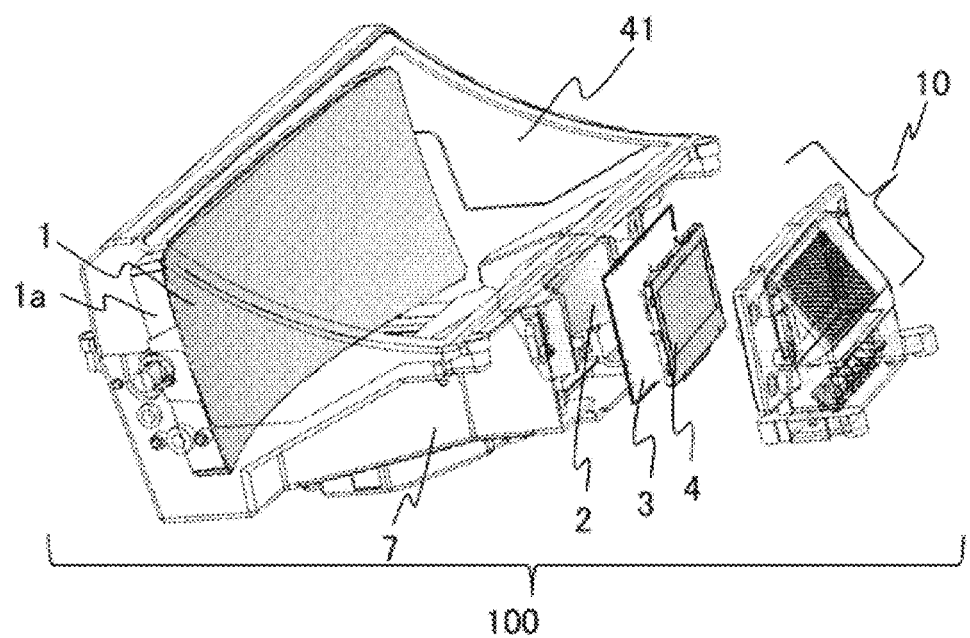
FIG. 9 is a diagram schematically illustrating the configuration of a virtual image optical system of an information display device in Embodiment 2.

FIG. 9 is a diagram illustrating the entire configuration of the HUD device 100 according to this embodiment. In FIG. 9, as described above, a concave (free-form surface) mirror 1 that projects image light for forming a virtual image through the windshield 6, a correction lens group 2 for correcting distortion or aberration generated at that time, an image display device 4, and a backlight source 10 forming a backlight are provided in this order from the downstream side. In addition, reference numeral 7 denotes a housing. Further, for example, an optical element 3 for suppressing a P-wave component is provided between the lens group 2 and the image display device 4 in order to suppress the P-wave component of sunlight that enters the inside of the HUD device 100.

First, in this embodiment, preferably, the concave (free-form surface) mirror 1 that projects image light has a function of reflecting visible light (wavelength: about 400 to 700 nm) and a function of removing, for example, infrared rays (IR) or ultraviolet rays (UV), which are unnecessary for the information display device and damages the device, particularly from sunlight including various wavelength spectra. At that time, when the reflectance of the concave mirror for visible light is 95% or more, it is possible to achieve a virtual image optical system with high light use efficiency.

However, in contrast, when the concave (free-form surface) mirror 1 is viewed directly through the windshield, external light is reflected and dazzles the eyes and the quality of the car deteriorates. In addition, strong light, such as sunlight or headlights of oncoming vehicles at night, is reflected by the concave mirror 1 and some of light beams return to a liquid crystal panel, which causes the deterioration of the quality, such as the contrast performance, of the image (virtual image) obtained by the information display device and the damage of a polarizing plate or a liquid crystal panel forming the image display device 4. Therefore, the above-mentioned problems can be solved by intentionally reducing the reflectance of the concave (free-form surface) mirror 1 to 90% or less, preferably, 85% or less.

As a concave mirror support portion 1a which is a base material of the concave (free-form surface) mirror 1, a material having high transparency is selected such that the base material does not absorb light with a wavelength component which is not reflected in the sunlight. Examples of the base material which is made of plastic and has high transparency include (1) ZEONEX produced by Zeon Corporation, (2) polycarbonate, and (3) acrylic. (1) ZEONEX which has a water absorption rate of almost 0% and a high heat distortion temperature is optimal. However, since ZEONEX is expensive, polycarbonate which has the same heat distortion temperature as ZEONEX and a water absorption rate of about 0.2% may be examined and used. For acrylic which has the highest moldability and is inexpensive, since the acrylic has the highest moisture absorption rate, it is essential to provide a moisture-proof film and a reflective film.

In addition to the reflective film which is formed on the reflective surface, a silicon nitride (SiN) film may be formed as a moisture-proof film on the opposite surface in order to prevent the base material of the concave (free-form surface) mirror 1 from absorbing moisture. Since the SiN film which is the moisture-proof film transmits sunlight, light absorption does not occur in the base material and it is possible to suppress thermal deformation. As a result, it is possible to prevent a change in shape due to moisture absorption even in the concave (free-form surface) mirror formed by molding polycarbonate or acrylic.

Further, in addition to or instead of the concave (free-form surface) mirror 1 having the function of suppressing/removing IR or UV, a light transmitting plate having a function of removing IR or UV may be provided in an opening portion 41 formed in an upper part of the HUD device 100, which is not illustrated in the drawings. In this case, in addition to the function of suppressing IR or UV, it is possible to prevent external dust from entering the inside of the HUD device 100.

As described above, according to the concave mirror 1, in the sunlight including a large number of spectral components that enter the inside of the HUD device 100 through the opening portion 41, it is possible to remove components unnecessary in the HUD device and to mainly and selectively extract visible light components.

In contrast, it is known that, as a factor of deteriorating the image quality of the HUD device, the image light beam emitted from the image display device 4 to the concave mirror 1 is reflected from the surface of the optical element 2 provided in the middle, returns to the image display device, is reflected again, and is superimposed on the original image light to deteriorate image quality. Therefore, in this embodiment, it is preferable to design one of an image light incident surface and an image light emission surface of the optical element 2 or both lens surfaces with restrictions in shape such that the reflected light does not extremely focus on a part of the image display device 4, in addition to forming an anti-reflection film on the surface of the optical element 2 to suppress reflection.

Next, when the image display device 4 is a liquid crystal panel in which a polarizing plate is provided to absorb the reflected light from the optical element 2, it is possible to prevent the deterioration of image quality. Further, in the backlight source 10 of the liquid crystal panel, the incident direction of light on the image display device 4 is controlled such that light is efficiently incident on the entrance pupil of the concave mirror 1. Further, a solid-state light source having a long product lifetime is preferably used as the light source. Furthermore, it is preferable that a light emitting diode (LED) having a small change in optical output with respect to a change in ambient temperature is used and polarization conversion is performed using a polarizing beam splitter (PBS) provided with an optical means for reducing the divergence angle of light.

Polarizing plates are provided on a side (light incident surface) of the liquid crystal panel close to the backlight source 10 and a side (light emission surface) thereof close to the optical element 2 to increase the contrast ratio of image light. A high contrast ratio can be obtained by using an iodine-based polarizing plate having a high degree of polarization as the polarizing plate provided on the side (light incident surface) of the backlight source 10. In contrast, a dye-based polarizing plate is used as the polarizing plate provided on the side (light emission surface) of the optical element 2 to obtain high reliability even in a case in which external light is incident or the environmental temperature is high.

In a case in which a liquid crystal panel is used as the image display device 4, particularly, in a case in which the driver wears polarized sunglasses, there is a problem that a specific polarized wave is blocked and an image is not seen. In order to prevent this, it is preferable that a λ/4 plate is provided on the optical element side of the polarizing plate provided on the side of the liquid crystal panel close to the optical element 2 to convert image light aligned in a specific polarization direction into circularly polarized light.

Embodiment 3

In this embodiment, the more detailed optical configuration of the projection optical device having the real image optical system of the information display device will be described.

Figure 10:
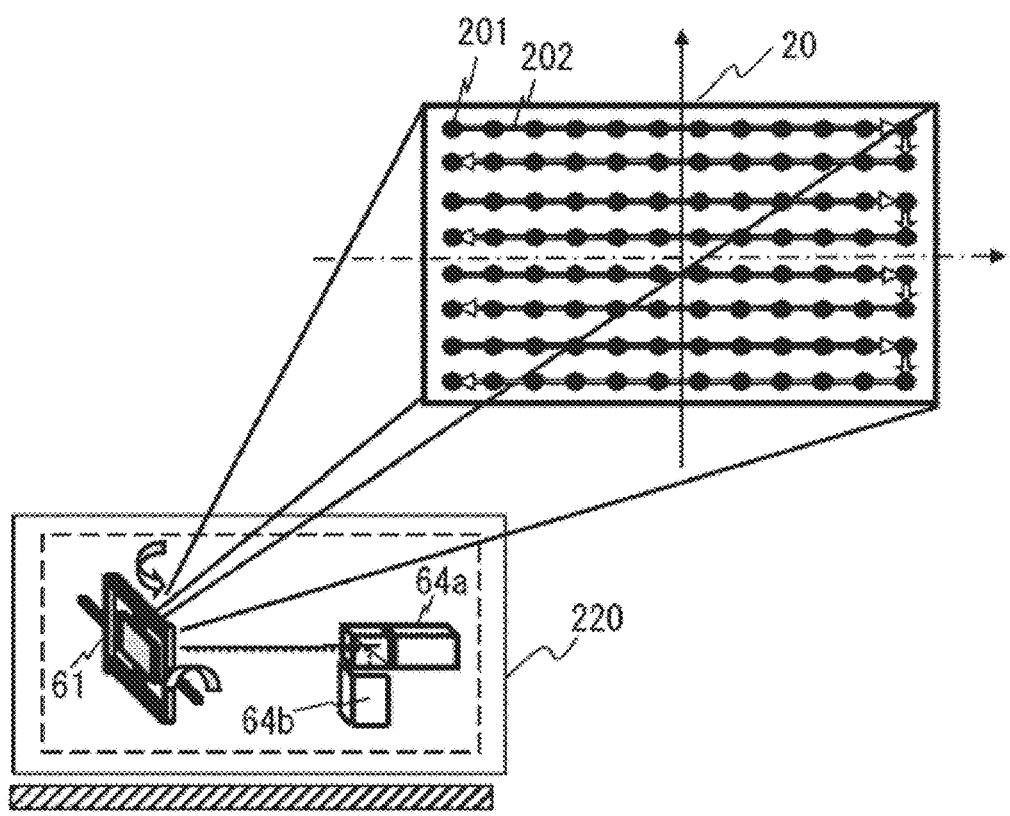
FIG. 10 is a diagram illustrating the basic configuration of a projection optical device in Embodiment 3.

FIG. 10 is a diagram illustrating the basic configuration of the projection optical device 220 that performs scanning with laser light using the MEMS to obtain a real image in this embodiment. In FIG. 10, the projection optical device 220 is a scanning-type image display device that is provided with an optical scanning device which performs scanning in a two-dimensional direction with the laser beam subjected to light intensity modulation (hereinafter, referred to as "modulation") according to an image signal and scans an irradiation target (for example, a windshield) with the laser beam using the optical scanning device to draws an image. That is, a laser beam from a light source unit 64 (64a and 64b) is reflected by a scanning mirror 61 having a rotation shaft to perform scanning with the laser light. Conceptually, each modulated pixel 201 is two-dimensionally scanned on an image plane along a laser light scanning trajectory 202 of a display surface 20.

Hereinafter, the two-dimensional deflection operation of the scanning mirror 61 in this embodiment will be described in detail.

Figure 11:
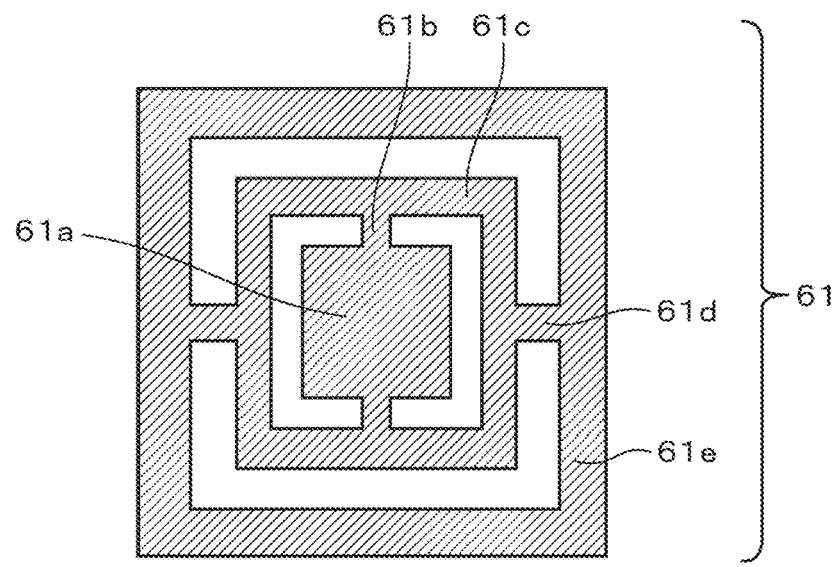
FIG. 11 is a diagram schematically illustrating the configuration a two-axis driven MEMS element in Embodiment 3.

FIG. 11 is a diagram schematically illustrating the configuration of the scanning mirror 61 which is a two-axis driven MEMS element in this embodiment. In FIG. 11, a scanning mirror surface 61a that deflects a laser beam at a reflection angle is connected to first torsion springs 61b that are coaxially provided so as to face each other, with the scanning mirror surface 61a interposed therebetween. In addition, the torsion spring 61b is connected to a holding member 61c and the holding member 61c is connected to a second torsion spring 61d. The second torsion spring 61d is connected to a frame 61e. Then, permanent magnets and coils (not illustrated) are provided at positions that are substantially symmetric with respect to each of the torsion springs 61b and 61d. The coil is formed substantially in parallel to the scanning mirror surface 61a of the scanning mirror 61. When the scanning mirror surface 61a of the scanning mirror 61 is in a stationary state, the coil generates a magnetic field substantially parallel to the scanning mirror surface 61a. When a current flows to the coil, the Lorentz force substantially perpendicular to the scanning mirror surface 61a is generated by the Fleming's left-hand rule.

The scanning mirror surface 61a is rotated to a position where the Lorentz force and the restoring force of the torsion springs 61b and 61d are balanced. For the torsion spring 61b, an alternating current is supplied to the coil at the resonance frequency of the scanning mirror surface 61a such that the scanning mirror surface 61a performs a resonance operation. Similarly, for the torsion spring 61d, an alternating current is supplied to the coil at the resonance frequency of a combination of the scanning mirror surface 61a and the holding member 61c such that the scanning mirror surface 61a, the torsion spring 61b, and the holding member 61c perform a resonance operation. This makes it possible to perform the resonance operation at different resonance frequencies in two directions.

Figure 12:
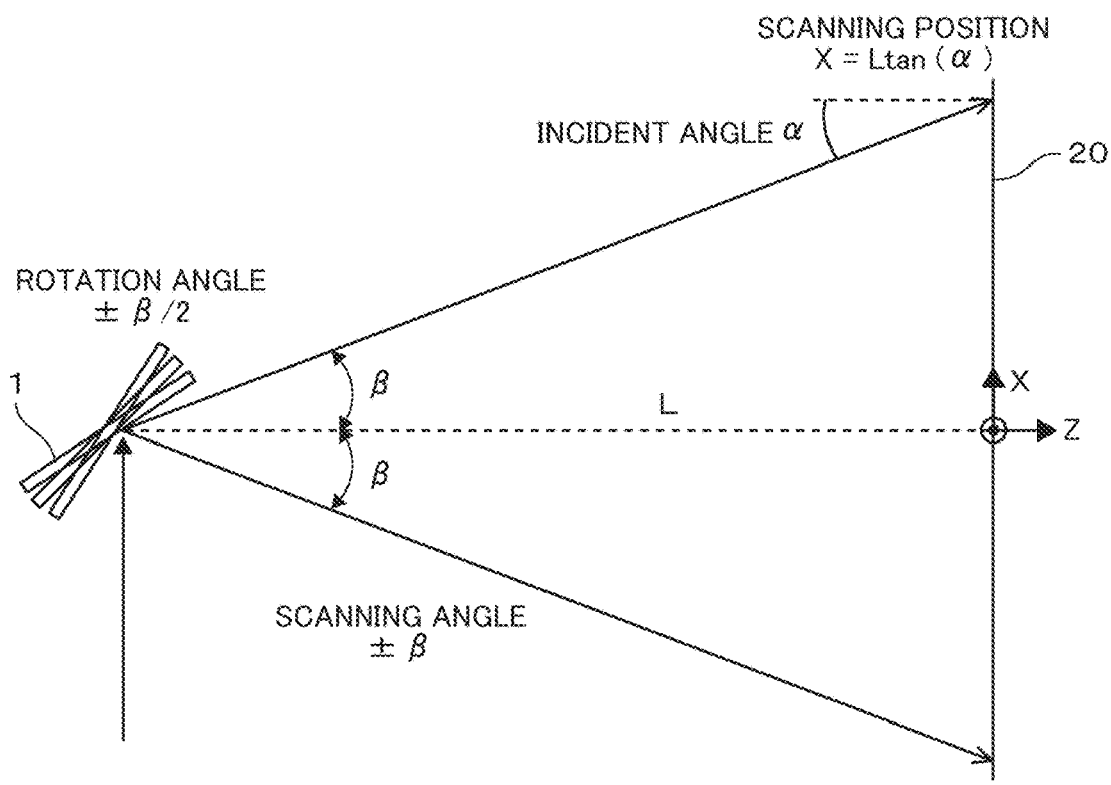
FIG. 12 is a diagram describing the outline of light beam scanning by the MEMS element in Embodiment 3.

In FIG. 12, when the rotation angle of the scanning mirror 61 which is a reflective surface of the optical scanning unit is $\beta/2$, a scanning angle which is the angle of a reflected light beam is changed to $\beta$ that is twice the rotation angle. Here, in a case in which no optical elements are provided between the scanning mirror 61 and the display surface 20, the scanning angle $\beta$ is equal to the incident angle $\alpha$ on the display surface 20. Therefore, the size of the scanned image with respect to a certain projection distance is determined by the rotation angle $\beta/2$ of the scanning mirror 61. For this reason, in this embodiment, in order to obtain a large screen at a short distance, an optical system (a concave lens or a convex mirror) is provided between the scanning mirror 61 illustrated in FIG. 10 and the windshield which is a projection surface (this configuration is not illustrated) to increase the above-mentioned amplitude.

In this embodiment, since an image is superimposed on the near view seen by the viewer, the distance from the viewer to the image is short. Therefore, it is necessary to increase the image display region in the horizontal direction with respect to the vertical direction. For this reason, the inventors fixed the distance between the driver who was a viewer and the lower part of the windshield to 1.2 m and calculated the optimum value of an image display width using actual measurement. The inventors found that it was necessary to set the display range in the horizontal direction to 30 inches or more in order to display that the driving car is turning left or right with an arrow in addition to the rotation angle of the steering wheel and better image display could be performed when an image with a size of 40 inches or more could be displayed.

In contrast, the inventors found that clear display was possible when the display region in the vertical direction was 10 inches. In addition, it was confirmed that it was necessary to expand the display range to about 20 inches in order to further increase the visibility of display; it was necessary to reduce the amplitude in the horizontal direction when the amplitude in the vertical direction was increased in the driving of the MEMS; and an image sufficient for practical use could be obtained when the upper limit of the display range was set to 15 inches.

Next, a first scanning state of the laser light with which the image plane is scanned in this embodiment will be described.

FIG. 13 illustrates the first scanning state of the laser light from the optical scanning unit in this embodiment. As described above, the scanning range (amplitude) of the optical scanning unit in this embodiment is set such that an amplitude angle in the horizontal direction is equal to or greater than twice an amplitude angle in the vertical direction and an image display range in the horizontal direction is wider than that in the vertical direction. The size of laser light on the windshield is set as one pixel and the windshield is scanned with laser light 301 in the horizontal direction from the left to the right. Then, the scanning position is moved down by one pixel and scanning is performed from the right to the left. Reference numeral 302 denotes a scanning trajectory of a first scanning unit. The frame rate at which images are switched may be 1/60 Hz when the traveling speed of the car is 40 km/h. When the traveling speed was 100 km/h, the frame rate was set to 1/120 Hz. That is, the rewriting speed of a display image was increased according to the traveling speed of the car such that optimal display could be performed.

At this time, for the optical scanning unit according to this embodiment, the product of a frame frequency F, a horizontal deflection frequency fh, and a vertical deflection frequency fv is a substantially constant value A as illustrated in Expression (3). Therefore, the frame rate is changed on the basis of the traveling speed information of the car from the drive assist ECU 62 illustrated in FIG. 1B. The horizontal deflection frequency is reduced by Expression (3) and the deflection angle is also reduced in proportion to the horizontal deflection frequency at the same time.

[Equation 3]

$$A = F(fh \times fv) \quad (3)$$

As a result, the size of the image display range, in which an image is displayed, in the horizontal direction is reduced. However, the field of view of the driver becomes narrower as the traveling speed becomes higher. Therefore, it is possible to obtain an information display device that does not cause any discomfort during use.

In the first scanning state according to this embodiment, monochromatic laser light of three colors (red (635 nm), green (532 nm), and blue (460 nm)) illustrated in FIG. 14 was used. FIG. 16 illustrates the result of converting the monochromatic light obtained by combining these colors and chromaticity when these colors are combined into coordinates on a chromaticity diagram illustrated in FIG. 15. Since the color purity of each single color was high, sufficient brightness was obtained while covering the display color range of the NTSC system.

Furthermore, in a case in which light beams of other colors were mixed when light of each single color was emitted, for example, in a case in which, when blue laser light is emitted with 100% emission intensity, green laser light was emitted with 10% of the maximum emission intensity and red laser light was emitted with 5% of the maximum emission intensity at the same time, the mixed color light was a color corresponding to blue and the brightness of the mixed color light was equal to or more than twice the brightness of the single color. As described above, it was also found that the scanning unit of the type according to the invention mixed laser light beams of other colors instead of monochromatic laser light to further improve the brightness of pseudo-monochromatic light.

Next, a second scanning state of the laser light with which the image plane is scanned in this embodiment will be described.

Figure 17:
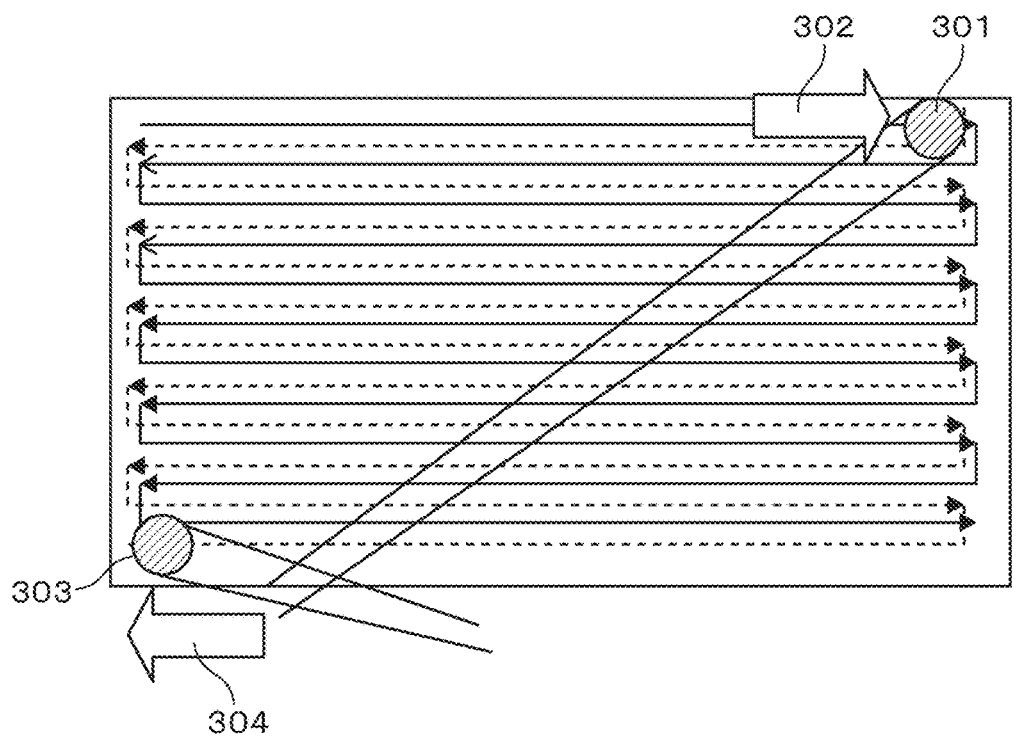
FIG. 17 is a diagram describing a second scanning state of laser light with which the projection target member (the inner surface of a windshield) is scanned in Embodiment 3.

FIG. 17 illustrates the second scanning state of the laser light from the optical scanning unit in this embodiment. The second scanning state differs from the first scanning state in that a plurality of optical scanning units are provided, that is, two optical scanning units of a first scanning unit and a second scanning unit are provided in FIG. 17. The scanning range (amplitude) of the first scanning unit is set such that an amplitude angle in the horizontal direction is equal to or greater than twice that in the vertical direction and an image display range in the horizontal direction is wider than that in the vertical direction. The size of laser light 301 on the windshield is set as one pixel and the windshield is scanned with a beam in the horizontal direction, that is, the windshield is scanned in the direction from the left to the right along a trajectory represented by a solid line in FIG. 17. Then, the scanning position is moved down by one pixel and scanning is performed from the right to the left. Reference numeral 302 denotes a scanning trajectory of the first scanning unit.

In contrast, the scanning range (amplitude) of the second scanning unit is set such that an amplitude angle in the horizontal direction is equal to or greater than twice that in the vertical direction and an image display range in the horizontal direction is wider than that in the vertical direction, as in the first scanning unit. The size of laser light 303 on the windshield is set as one pixel and the windshield is scanned with a beam in the horizontal direction, that is, the windshield is scanned in the direction from the left to the right along a trajectory represented by a dashed line in FIG. 17. Then, the scanning position is moved down by one pixel and scanning is performed from the right to the left. In addition, FIG. 17 illustrates a state in which the laser light 303 has reached the last pixel at the bottom. The second scanning unit may perform scanning in the direction from the upper side to the lower side or in the direction from the lower side to the upper side. Reference numeral 304 denotes a scanning trajectory of the second scanning unit. At this time, the display of the next frame of the frame image displayed by the first scanning unit is shifted by about ½ frame and the next frame image is displayed.

Figure 18:
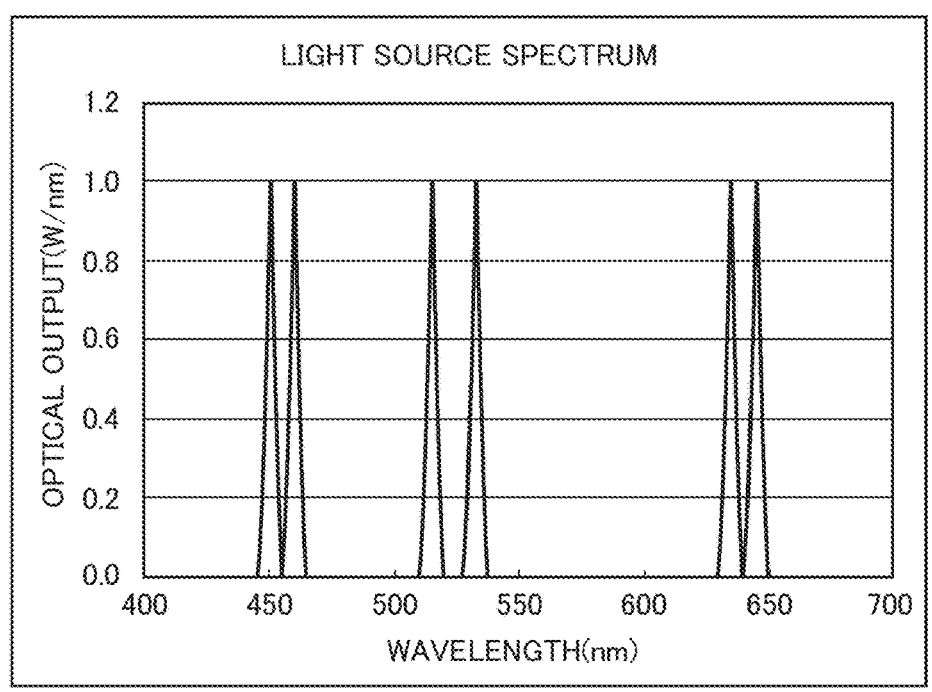
FIG. 18 is a diagram illustrating a light source light spectrum of the optical scanning device in the second scanning state in Embodiment 3.
Figure 20:
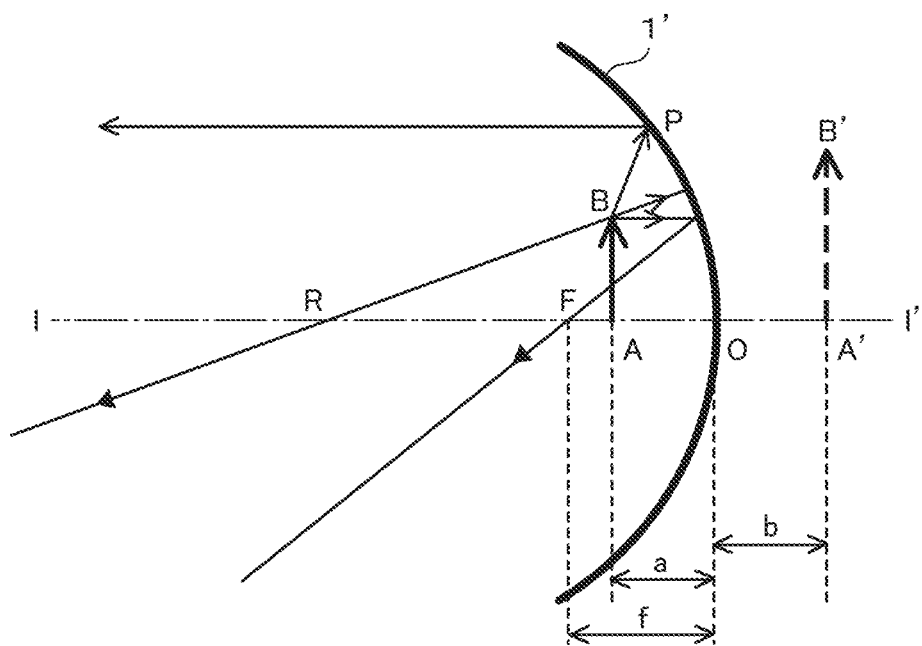
FIG. 20 is a diagram for schematically describing the principle of a virtual image optical system according to the related art.

As a result, it was confirmed that the frame rate could be doubled in a pseudo manner. Further, the first scanning unit in the second scanning state used monochromatic laser light of three colors, that is, red (635 nm), green (532 nm), and blue (460 nm) illustrated in FIG. 18. In addition, the second scanning unit used monochromatic laser light of three colors, that is, red (645 nm), green (515 nm), and blue (450 nm) illustrated in FIG. 18 to reduce speckles. For monochromatic light obtained by combining these colors and chromaticity when these colors were combined, as illustrated in FIG. 19, since the color purity of each single color of the laser light source forming two scanning units was high, sufficient brightness was obtained while covering the display color range of the NTSC system.

Further, in a case in which each of the first scanning unit (hereinafter, referred to as (1)) and the second scanning unit (hereinafter, referred to as (2)) mixed light beams of other colors when emitting light beams of each single color, for example, in a case in which, when the second scanning unit emitted blue laser light (1) and blue laser light (2) with 100% emission intensity, it emitted green laser light (1) with 5% of the maximum emission intensity, emitted green laser light (2) with 10% of the maximum emission intensity, and emitted red laser light (1) with 5% of the maximum emission intensity at the same time, the mixed color light had a color corresponding to blue and the brightness of the mixed color light was equal to or more than twice the brightness of the single color.

As described above, according to this embodiment, it was also found that the brightness of pseudo-monochromatic light could be further improved by mixing laser light of other colors instead of monochromatic laser light even when a plurality of scanning units overlapping each other were used. In this embodiment, the effect when two scanning units are used at the same time has been described. However, three or more scanning units may be used at the same time. In this case, it is possible to increase the frame rate in a pseudo manner. In addition, laser beams with different wavelengths are used for the scanning units and are superimposed on each other to significantly reduce speckle noise. It is also possible to improve brightness without damaging the chromaticity of a single color as described above.

Embodiment 4

In this embodiment, the detailed configuration of display by the instrument panel of the information display device will be described.

Since the instrument panel 42 illustrated in FIG. 1A is provided in an inner diameter portion of the steering wheel 43, the movement of the viewpoint of the driver who is a viewer from the image displayed on the instrument panel 42 is the largest. For this reason, information with a low degree of urgency is displayed except during the autonomous driving of the car in the autonomous driving mode. When the viewpoint of the driver is sensed by the viewing camera 210 and the displayed image is changed, a large amount of image information can be effectively displayed to the driver.

A liquid crystal panel is used as the instrument panel in order to reduce the thickness of the device. The instrument panel may be formed in a curved shape with emphasis on the interior design of the car. In addition, the display speed is set to 120 Hz that is twice the frame rate (60 Hz) or 240 Hz that is four times the frame rate (60 Hz) to switch display content at a high speed, which makes it possible to display image information from the viewing camera provided outside the car in real time.

Embodiment 5

The information display device has the image display region 1(*a*), the image display region 2(*a*), and the image display region 3(*a*) as three types of information display positions illustrated in FIG. 3. In contrast, for example, the viewing camera 210 illustrated in FIG. 1A or FIG. 2A may be used as the sensor that senses the movement of the viewpoint of the driver who is a viewer and the optimal position, time, and content of the images displayed at three types of information display positions may be combined and displayed in correspondence with the information of the movement of the viewpoint of the viewer and the speed of the car. In this case, it is possible to provide an information display device effective in assisting safe driving. For example, control is performed to change the information display position to a turning direction with the movement of the viewpoint of the viewer at the time of turning.

The centers of the above-mentioned three information display positions are displayed in the vicinity of a straight line including the central axis of rotation of the steering wheel. Therefore, the viewpoint of the driver who is a viewer equally moves to the left and the right in the horizontal direction. As a result, the effect of suppressing fatigue during driving and the effect of minimizing the movement of the viewpoint are obtained.

The information display devices according to various embodiments of the invention have been described above. However, the invention is not limited only to the above-described embodiments and includes various modification examples. For example, in the above-described embodiments, the entire system has been described in detail in order to easily explain the invention. However, the invention is not necessarily limited to the embodiments having all of the above-mentioned configurations. Further, a part of the configuration of one embodiment can be replaced with the configuration of another embodiment and the configuration of one embodiment can be added to the configuration of another embodiment. Furthermore, another configuration can be added to, removed from, and replaced with a part of the configuration of each embodiment.

REFERENCE SIGNS LIST

1 Concave mirror
1*a* Concave mirror support portion
2, 3 Optical element (lens)
4 Image display device
6 Projection target member (windshield)
8 Viewpoint of driver (Eyebox)
10 Backlight source
41 Opening portion
42 Instrument panel
43 Steering wheel
44 Front cover
45 Car body
50 Sun
100 HUD device
101 Car
210 Viewing camera
220 Projection optical device
201 Pixel
202 Scanning trajectory of laser light
301 Laser light of first scanning unit
302 Scanning trajectory of first scanning unit
303 Laser light of second scanning unit
304 Scanning trajectory of second scanning unit
20 Display surface
61 Scanning mirror
1(*a*), 2(*a*), 3(*a*), 1(*b*), 2(*b*), 3(*b*) Image display region

The invention claimed is:

1. An information display device that displays information in a vehicle, comprising:
a first information display device that displays image information of a virtual image using reflection from a windshield of the vehicle;
a second information display device that scans the windshield with laser light using a MEMS element to obtain a real image; and
a third information display device using an instrument panel of the vehicle,
a sensor that views movement of a viewpoint of a viewer,
wherein the first information display device includes a virtual image optical system that reflects light emitted from an image display device which displays the image information to the windshield to display a virtual image in front of the vehicle,
wherein the second information display device includes a real image optical system that performs scanning with laser light using a scanning-type mirror element and displays a real image on the windshield,
wherein the third information display device includes a direct-view-type image display device as the instrument panel,
wherein an image display position of the first information display device is in the vicinity of a center of the windshield and an image display position of the second information display device is a lower part of the windshield, and
wherein display positions, display time, and display content of images displayed by the first to third information display devices are changed on the basis of information of the movement of the viewpoint of the viewer by the sensor.

2. The information display device according to claim 1, wherein centers of the image display positions displayed by the first to third information display devices are arranged in the vicinity of a straight line including a central axis of rotation of a steering wheel of the vehicle.

3. The information display device according to claim 1, wherein, in the display of an image based on the virtual image by the first information display device, the virtual image is displayed so as to be superimposed on a real view which is located far from the windshield on which the real image is displayed by the second information display device.

4. The information display device according to claim 1, wherein an image based on the virtual image of the first information display device is displayed so as to be superimposed on a part or all of an image based on the real image of the second information display device.

5. The information display device according to claim 1, wherein a horizontal display dimension on the windshield in the display of an image based on the virtual image by the first information display device which is seen by a viewer through the windshield is less than a horizontal display dimension in the display of the real image by the second information display device.

6. The information display device according to claim 1, An information display device that displays information in a vehicle, comprising:
   a first information display device that displays image information of a virtual image using reflection from a windshield of the vehicle;
   a second information display device that scans the windshield with laser light using a MEMS element to obtain a real image; and
   a third information display device using an instrument panel of the vehicle,
   wherein the first information display device includes a virtual image optical system that reflects light emitted from an image display device which displays the image information to the windshield to display a virtual image in front of the vehicle,
   wherein the second information display device includes a real image optical system that performs scanning with laser light using a scanning-type mirror element and displays a real image on the windshield,
   wherein the third information display device includes a direct-view-type image display device as the instrument panel,
   wherein an image display position of the first information display device is in the vicinity of a center of the windshield and an image display position of the second information display device is a lower part of the windshield, and
   wherein an image display range of the second information display device is changed according to an output of a sensor that senses a speed of the vehicle and is displayed on the windshield.

7. The information display device according to claim 6, wherein centers of the image display positions displayed by the first to third information display devices are arranged in the vicinity of a straight line including a central axis of rotation of a steering wheel of the vehicle.

8. The information display device according to claim 6, wherein, in the display of an image based on the virtual image by the first information display device, the virtual image is displayed so as to be superimposed on a real view which is located far from the windshield on which the real image is displayed by the second information display device.

9. The information display device according to claim 6, wherein an image based on the virtual image of the first information display device is displayed so as to be superimposed on a part or all of an image based on the real image of the second information display device.

10. The information display device according to claim 6, wherein a horizontal display dimension on the windshield in the display of an image based on the virtual image by the first information display device which is seen by a viewer through the windshield is less than a horizontal display dimension in the display of the real image by the second information display device.

* * * * *

UNITED STATES PATENT AND TRADEMARK OFFICE
CERTIFICATE OF CORRECTION

PATENT NO. : 10,994,613 B2
APPLICATION NO. : 16/636655
DATED : May 4, 2021
INVENTOR(S) : Koji Hirata It is certified that error appears in the above-identified patent and that said Letters Patent is hereby corrected as shown below:

In the Claims

Column 17, Claim 6; Line 1: "The information display device according to claim 1," is deleted.

Signed and Sealed this
Seventh Day of March, 2023

Katherine Kelly Vidal
*Director of the United States Patent and Trademark Office*